(12) United States Patent
French et al.

(10) Patent No.: US 9,819,953 B2
(45) Date of Patent: Nov. 14, 2017

(54) DECODING MEDIA STREAMS WITHIN THRESHOLDS

(71) Applicants: International Business Machines Corporation, Armonk, NY (US); University College Dublin, Dublin (IE)

(72) Inventors: Paul B. French, Cork (IE); James P. Galvin, Jr., Georgetown, KY (US); Patrick McDonagh, Churchtown (IE); Patrick J. O'Sullivan, Ballsbridge (IE)

(73) Assignees: International Business Machines Corporation, Armonk, NY (US); University College Dublin, Belfield, Dublin (IE)

( * ) Notice: Subject to any disclaimer, the term of this patent is extended or adjusted under 35 U.S.C. 154(b) by 319 days.

(21) Appl. No.: 14/144,771

(22) Filed: Dec. 31, 2013

(65) Prior Publication Data
US 2015/0189394 A1    Jul. 2, 2015

(51) Int. Cl.
*H04N 7/173*    (2011.01)
*H04N 19/44*    (2014.01)
(Continued)

(52) U.S. Cl.
CPC .............. *H04N 19/44* (2014.11); *H04L 65/80* (2013.01); *H04N 21/4381* (2013.01);
(Continued)

(58) Field of Classification Search
CPC ......... H04N 21/4381; H04N 21/44209; H04N 21/6125; H04N 21/6473; H04N 21/64322
(Continued)

(56) References Cited

U.S. PATENT DOCUMENTS 6,357,028 B1    3/2002    Zhu
6,983,323 B2    1/2006    Cantrell et al.
(Continued)

FOREIGN PATENT DOCUMENTS

EP    1362485 B1    8/2008
EP    2 530 969 A1    5/2012

OTHER PUBLICATIONS

Mu Mu et al., "Framework for the Integrated Video Quality Assessment," Multimedia Tools and Applications, Dec. 28, 2011, pp. 1-31.

*Primary Examiner* — Michael B Pierorazio
(74) *Attorney, Agent, or Firm* — Brian J. Colandreo, Esq.; Jeffrey T. Placker, Esq.; Holland & Knight LLP

(57) ABSTRACT

A computer-implemented method, computer program product, and computing system is provided for decoding media streams. In an implementation, a method may include selecting a time window for monitoring discontinuities in a plurality of packets in a media transmission stream having a first time and a second time. The first time may indicate a beginning of the time window and the second time may indicate an end of the time window. The method may also include determining the number of discontinuities in the plurality of packets at the first time at a network node. The method may also include determining the number of discontinuities in the plurality of packets at the second time at the network node. The method may also include determining the number of discontinuities in the plurality of packets within the time window. The method may also include comparing the number of discontinuities within the time widow to a plurality of predefined discontinuities threshold values. The method may also include decoding one or more of the plurality of packets in the media stream based upon, at least in part, the comparison of the number of disconti-
(Continued)

nuities within the time widow to the plurality of predefined discontinuities threshold values.

20 Claims, 6 Drawing Sheets

(51) Int. Cl.
*H04L 29/06* (2006.01)
*H04N 21/438* (2011.01)
*H04N 21/442* (2011.01)
*H04N 21/61* (2011.01)
*H04N 21/647* (2011.01)
*H04N 21/643* (2011.01)

(52) U.S. Cl.
CPC ... *H04N 21/44209* (2013.01); *H04N 21/6125* (2013.01); *H04N 21/6473* (2013.01); *H04N 21/64322* (2013.01)

(58) Field of Classification Search
USPC .......................................................... 725/109
See application file for complete search history.

(56) References Cited

U.S. PATENT DOCUMENTS

| | | | |
|---|---|---|---|
| 7,072,305 B1 | 7/2006 | Gregson | |
| 7,617,509 B1 | 11/2009 | Brunheroto et al. | |
| 8,284,259 B2 | 10/2012 | Karacali-Akyamac | |
| 2002/0053053 A1 | 5/2002 | Nagai et al. | |
| 2005/0120124 A1* | 6/2005 | Korhonen | H04L 1/0007 709/231 |
| 2005/0262529 A1 | 11/2005 | Neogi et al. | |
| 2007/0242655 A1 | 10/2007 | Li et al. | |
| 2008/0192119 A1 | 8/2008 | Li et al. | |
| 2008/0259962 A1* | 10/2008 | Mori | H04N 21/4305 370/498 |
| 2009/0158326 A1* | 6/2009 | Hunt | G06F 3/04817 725/38 |
| 2009/0276821 A1 | 11/2009 | Amento et al. | |
| 2011/0301947 A1 | 12/2011 | Anandakumar et al. | |
| 2012/0226987 A1 | 9/2012 | Wie et al. | |
| 2012/0311173 A1 | 12/2012 | Agarwal et al. | |
| 2014/0233587 A1 | 8/2014 | Liu et al. | |
| 2014/0267787 A1 | 9/2014 | Fitzpatrick et al. | |
| 2014/0269275 A1 | 9/2014 | Jun et al. | |
| 2015/0082366 A1 | 3/2015 | French et al. | |
| 2015/0120896 A1 | 4/2015 | Dunne et al. | |
| 2015/0135246 A1 | 5/2015 | Dunne et al. | |
| 2015/0138994 A1 | 5/2015 | Dadheech et al. | |
| 2015/0142146 A1 | 5/2015 | Dunne et al. | |

* cited by examiner

DECODING MEDIA STREAMS WITHIN THRESHOLDS

TECHNICAL FIELD

The present disclosure generally relates to systems and methods for decoding media streams within thresholds.

BACKGROUND

Media streaming is a form of communication services that allow end-users to enjoy their favorite television or radio shows or other transmitted events over communication mediums such as the Internet. The quality of media streaming presented to an end-user when delivered from a provider is an essential aspect for enjoying the streamed media. There are many forms of media streaming, some examples may be, video streaming, audio streaming, and data streaming. As an example, video streaming systems include, but not limited to, Internet Protocol Television (IPTV), webTV, as well as various other media streaming systems. For example, IPTV is a system for delivering television services over the Internet. Although stream media signals, such as video signals, may be in optimal form when leaving the source, as the video signals travel through the network to reach the end-user, the quality of the video may degrade resulting in an impaired end-user experience. Although basic Internet Protocol (IP) metrics such as jitter, delay and loss may be monitored along the network path, these IP metrics may not provide an insight the media quality experienced by the end-user. Quality of Experience (QoE) may be a subjective measure of an end-user's experience with a service (e.g., video broadcast, audio broadcast, surfing the Internet, etc.).

SUMMARY OF DISCLOSURE

According to an implementation, a computer-implemented method may include selecting, by one or more processors, a time window for monitoring discontinuities in a plurality of packets in a media transmission stream. The time window may have a first time that may indicate the beginning of the time window and a second time that may indicate the end of the time window. The method may also include determining a number of discontinuities in the plurality of packets at the first time at a network node. The method may also include determining the number of discontinuities in the plurality of packets at the second time at the network node. The method may also include determining the number of discontinuities in the plurality of packets within the time window. The method may also include comparing the number of discontinuities within the time widow to a plurality of predefined discontinuities threshold values. The method may also include decoding one or more of the plurality of packets in the media stream based upon, at least in part, the comparison of the number of discontinuities within the time widow to the plurality of predefined discontinuities threshold values.

One or more of the following features may be included. The media transmission stream may include an MPEG-TS and the discontinuities in the plurality of packets may include MPEG-TS packet discontinuities. The media transmission stream may include at least one of a video transmission, a voice transmission, and a data transmission over the Internet. The method my further include at least one of reporting information related to the quality of the media transmission stream within the time window and adapting the quality of the media transmission stream based upon, at least in part, the number of discontinuities within the time window. Decoding the one or more of the plurality of packets may further include decoding the one or more of the plurality of packets in the media transmission stream, when the number of discontinuities is between a first discontinuities threshold and a second discontinuities threshold. Decoding the one or more of the plurality of packets may further includes refraining from decoding the one or more of the plurality of packets in the media transmission stream when the number of discontinuities within the time window is outside the first discontinuities threshold and the second discontinuities threshold. Decoding the one or more of the plurality of packets may further include designating the media transmission stream as unsatisfactory in response to determining that the number of discontinuities may be above the second discontinuities threshold.

According to another implementation, a computer program product may include a computer readable medium having a plurality of instructions stored thereon. When executed by a processor, the instructions may cause the processor to perform operations including selecting a time window for monitoring discontinuities in a plurality of packets in a media transmission stream. The time window may have a first time that may indicate a beginning of the time window and a second time that may indicate an end of the time window. Instructions may be included for determining a number of discontinuities in the plurality of packets at the first time at a network node. Instructions may be included for determining the number of discontinuities in the plurality of packets at the second time at the network node. Instructions may be included for determining the number of discontinuities in the plurality of packets within the time window. Instructions may be included for comparing the number of discontinuities within the time widow to a plurality of predefined discontinuities threshold values. Instructions may be included for decoding one or more of the plurality of packets in the media stream based upon, at least in part, the comparison of the number of discontinuities within the time widow to the plurality of predefined discontinuities threshold values.

One or more of the following features may be included. The media transmission stream may include an MPEG-TS and the discontinuities in the plurality of packets may include MPEG-TS packet discontinuities. The media transmission stream may include at least one of a video transmission, a voice transmission, and a data transmission over the Internet. Instructions may further be included for at least one of reporting information related to the quality of the media transmission stream within the time window and adapting the quality of the media transmission stream based upon, at least in part, the number of discontinuities within the time window. Decoding the one or more of the plurality of packets may further include decoding the one or more of the plurality of packets in the media transmission stream, when the number of discontinuities is between a first discontinuities threshold and a second discontinuities threshold. Decoding the one or more of the plurality of packets may further includes refraining from decoding the one or more of the plurality of packets in the media transmission stream when the number of discontinuities within the time window is outside the first discontinuities threshold and the second discontinuities threshold. Decoding the one or more of the plurality of packets may further include designating the media transmission stream as unsatisfactory in response to determining that the number of discontinuities may be above the second discontinuities threshold.

According to another aspect of the disclosure, a computing system may include at least one processor device and at least one memory architecture coupled with the at least one processor device. The at least one processor device may be configured to select a time window for monitoring discontinuities in a plurality of packets in a media transmission stream. The time window may have a first time that may indicate the beginning of the time window and a second time that may indicate the end of the time window. The at least one processor device may also be configured to determine a number of discontinuities in the plurality of packets at the first time at a network node. The at least one processor device may also be configured to determine the number of discontinuities in the plurality of packets at the second time at the network node. The at least one processor device may be configured to determine the number of discontinuities in the plurality of packets within the time window. The at least one processor device may be configured to compare the number of discontinuities within the time widow to a plurality of predefined discontinuities threshold values. The at least one processor device may be configured to decode one or more of the plurality of packets in the media stream based upon, at least in part, the comparison of the number of discontinuities within the time widow to the plurality of predefined discontinuities threshold values.

One or more of the following features may be included. The media transmission stream may include an MPEG-TS and the discontinuities in the plurality of packets may include MPEG-TS packet discontinuities. The media transmission stream may include at least one of a video transmission, a voice transmission, and a data transmission over the Internet. The at least one processor device may be configured to at least one of report information related to the quality of the media transmission stream within the time window and adapt the quality of the media transmission stream based upon, at least in part, the number of discontinuities within the time window. Decoding the one or more of the plurality of packets may further include decoding the one or more of the plurality of packets in the media transmission stream, when the number of discontinuities is between a first discontinuities threshold and a second discontinuities threshold. Decoding the one or more of the plurality of packets may further includes refraining from decoding the one or more of the plurality of packets in the media transmission stream when the number of discontinuities within the time window is outside the first discontinuities threshold and the second discontinuities threshold.

The details of one or more implementations are set forth in the accompanying drawings and the description below. Other features and advantages will become apparent from the description, the drawings and the claims.

BRIEF DESCRIPTION OF THE DRAWINGS

Like reference symbols in the various drawings indicate like elements.

DETAILED DESCRIPTION

Figure 1:
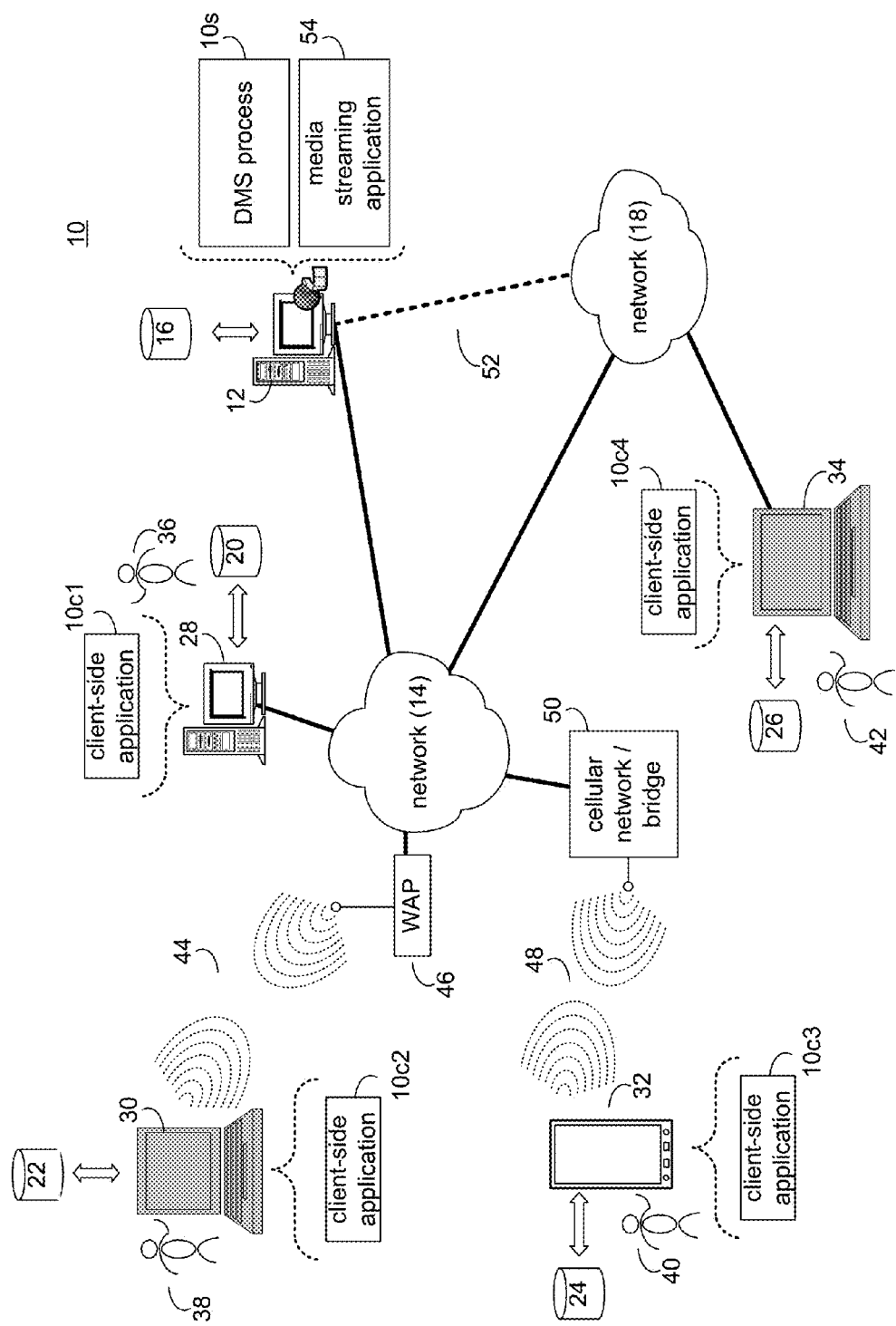
FIG. 1 is a diagrammatic view of a distributed computing network including a computing device that executes a DMS process according to an implementation of the present disclosure.

Media streaming is a technique for transferring media content (e.g., audio, video and data) over the Internet. For example, media content can be shared over the Internet using a number of media streaming systems, such as Internet Protocol Television (IPTV), webTV, as well as various other media streaming systems. Media streaming is becoming increasingly important with the growth of the Internet because media streaming does not require users to download the entire media content to their devices before the media can be enjoyed. Although video streaming is described in this disclosure, it is understood that other embodiments may include the various media streaming systems mentioned above (e.g., audio, data streaming). As explained above, quality of experience (QoE) may be a measure of a user's experience with a service (e.g., video broadcast, audio broadcast, surfing the Internet, etc.). QoE may focus on the entire service experience by measuring metrics that the customer may perceive as a quality parameter. This QoE may be influenced by many factors, such as, the user's terminal device, the user's environment, the user's expectations, the quality of the video, and the nature of the content and its importance.

In an embodiment, media streaming may be achieved by implementing an industry-standard for media streaming. One such media streaming standard for transmission and storage of video, audio, data, and other transmissions may be MPEG transport stream (MPEG-TS). The MPEG-TS is a system for multiplexing multimedia content into a single stream for transmission. MPEG-TS is composed of a series of "programs" each containing a collection of "elementary" streams, which are segmented in small packets. These elementary streams may contain video, audio or data streams for a particular program. These elementary streams are then divided up into smaller MPEG-TS packets. The MPEG-TS packets for all programs, consisting of their elementary streams are then multiplexed to produce the MPEG transport stream. MPEG-TS standard specifies the format of packets used for transporting the media from a server to the end-users. A packet is the basic unit of data in a transport stream, which may be transported to the end destination. Each packet may contain a header and payload information. The header contains the control information, which provides necessary information for the network to deliver the user data contained in the payload and the payload may contain the data being streamed.

An MPEG-TS discontinuity occurs when an MPEG-TS packet for a particular elementary stream experiences an error. The error may result in some degradation in video quality. In an embodiment, the header of a packet transporting media streams may include a portion that relay information about packet discontinuities, which may indicate trouble in a particular portion of the media stream (e.g., video content).

According to an embodiment, methods and systems may be provided for monitoring the quality of experience (QoE) associated with streaming media content (e.g., video, audio, data, etc.). In some embodiments, various metrics associated with media streaming may be measured to monitor and to adapt the media streams according to various rules and algorithms. For example, a metric that may be associated with a video stream may include packet discontinuities. The system and method for media streaming monitoring and adaptation may allow one or more nodes or an endpoint in transport or distribution network to detect and adjust possible errors in the media stream by tracking the number of media packets discontinuities.

In general, there are at least two types of communication transmissions that may be used for media streaming, for example, unicast and multicast type transmissions. Unicast may generally include a type of communication transmission in which information is sent from one sender to one receiver in a computing network. For example, unicast transmission may take place between a user and a server. For example, when a user accesses a webpage to listen to music or watch a video, that communication may be considered a unicast communication because it involves the user and the server where the music or the video reside. Multicast may generally include a type of communication transmission in which more than one sender and/or more than one receiver may be communicating. For example, in a video transmission involving more than one end-user devices (e.g., computer, television, tablet, cellular phone, etc.), multicast transmission may be used to send the same video transmission from a server to multiple end-user devices at the same time. For example, a live broadcast over the Internet may be viewed simultaneously by many end-users.

The end-user of a media streaming system may expect to experience the media without technical interruptions, and with the highest possible media quality. In an example of video streaming systems such as IPTV, video may be provided to end-users over the Internet. These video streaming systems may include a number of nodes (e.g., computers, servers, amplifiers, mixers, routers, switches, etc.) assisting in transporting video signals from a video source (e.g., video head-end) to end-users devices. Typically, signals may travel for some distance between the source and the end-user in media streaming. Signal degradation may be a common side effect, as the signals travel, resulting from loss or corruption of transmitted packets under certain conditions. For example, corruption of packets may cause signal degradation due to network medium (e.g., cables), bandwidth issues in cables, amplifiers, mixers, packet drop due to congestion, noise, and anything else between the source and the destination. Monitoring the quality of media streams may provide a way of minimizing signal degradation.

According to an embodiment, a threshold for packet discontinuities associated with a video stream may be defined. The threshold may be defined such that a level of packet discontinuities below the threshold may be considered small enough that the quality of experience associated with the video stream may be considered satisfactory. Further, the threshold may be defined such that a level of packet discontinuities above the threshold may be considered large enough to may be designate the quality of experience associated with the video stream unsatisfactory. It will be appreciated that a satisfactory quality of experience and an unsatisfactory quality of experience may be defined according to various user defined standards, default standards, preferences, and/or may otherwise be defined.

According to an embodiment, methods and systems may be provided for monitoring, decoding, performing quality adaptation, and retransmission of data packets experiencing degradation. One or more of the multiple nodes involved in transporting media signals from a video source to end-user devices (including the video source and end-user devices) may monitor, decode, perform quality adaptation, and retransmission of data packets experiencing degradation.

Referring to FIG. 1, there is shown a decoding of media streams within thresholds (DMS) process 10. For the following discussion, it is intended to be understood that DMS process 10 may be implemented in a variety of ways. For example, DMS process 10 may be implemented as a server-side process, a client-side process, or a server-side/client-side process.

For example, DMS process 10 may be implemented as a purely server-side process via DMS process 10s. Alternatively, DMS process 10 may be implemented as a purely client-side process via one or more of client-side application 10c1, client-side application 10c2, client-side application 10c3 and client-side application 10c4. Alternatively still, DMS process 10 may be implemented as a server-side/client-side process via screen DMS process 10s in combination with one or more of client-side application 10c1, client-side application 10c2, client-side application 10c3, and client-side application 10c4. In such an example, at least a portion of the functionality of DMS process 10 may be performed by DMS process 10s and at least a portion of the functionality of DMS process 10 may be performed by one or more of client-side application 10c1, 10c2, 10c3 and 10c4.

Accordingly, DMS process 10 as used in disclosure may include any combination of DMS process 10s, client-side application 10c1, client-side application 10c2, client-side application 10c3 and client-side application 10c4.

Figure 2:
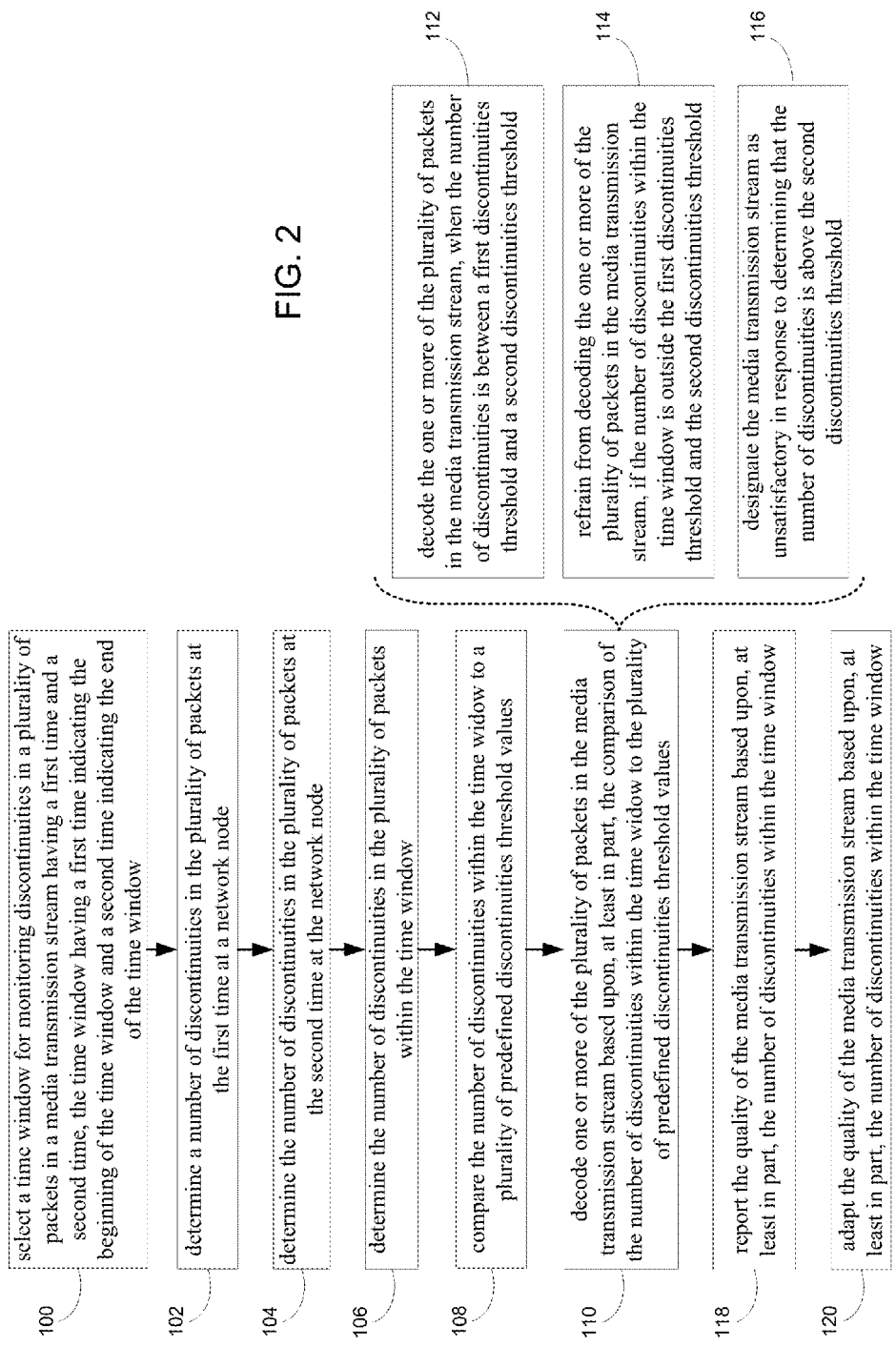
FIG. 2 is a flowchart of the DMS process of FIG. 1, according to an implementation of the present disclosure.

Referring also to FIG. 2, and as will be discussed in greater detail below, DMS process 10 may select 100 a time window for monitoring discontinuities in a plurality of packets in a media transmission stream. The time window may have a first time indicating a beginning of the time window and a second time indicating an end of the time window. The method may also determine 102 a number of discontinuities in the plurality of packets at the first time at a network node. The method may also determine 104 the number of discontinuities in the plurality of packets at the second time at the network node. The method may also determine 106 the number of discontinuities in the plurality of packets within the time window. The method may also compare 108 the number of discontinuities within the time widow to a plurality of predefined discontinuities threshold values. The method may also decode 110 one or more of the plurality of packets in the media stream based upon, at least in part, the comparison of the number of discontinuities within the time widow to the plurality of predefined discontinuities threshold values.

DMS process 10s may be a server application and may reside on and may be executed by computing device 12, which may be connected to network 14 (e.g., the Internet or a local area network). Examples of computing device 12 may include, but are not limited to a personal computer, a server computer, a series of server computers, a mini computer, a mainframe computer or a dedicated network device.

The instruction sets and subroutines of DMS process 10s, which may be stored on storage device 16 coupled to computing device 12, may be executed by one or more processors (not shown) and one or more memory architectures (not shown) included within computing device 12.

Examples of storage device 16 may include but are not limited to a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to an application incorporated into and executed within a client-side process incorporated into and executed with client-side media applications, a web browser, media decoder, such as, audio and video decoders. It is understood that the aforementioned may be incorporated into a mobile device platform. The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), a packet forwarding device (such as a router, a switch, or the like; not shown) and a dedicated network device (not shown). Client electronic devices 28, 30, 32, 34 may each execute an operating system.

Users 36, 38, 40, 42 may access DMS process 10 directly through network 14 or through secondary network 18. Further, screen capture process 10 may be accessed through secondary network 18 via link line 52.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 44 established between laptop computer 30 and wireless access point (WAP) 46. Similarly, mobile computing device 32 is shown wirelessly coupled to network 14 via wireless communication channel 48 established between mobile computing device 32 and cellular network/bridge 50, which is shown directly coupled to network 14. WAP 46 may be, for example, an IEEE 802.11a, 802.11b, 802.11g, 802.11n, Wi-Fi, and/or Bluetooth device that is capable of establishing wireless communication channel 44 between laptop computer 30 and WAP 46. Additionally, personal computer 34 is shown directly coupled to network 18 via a hardwired network connection.

In some embodiments, DMS process 10 may communicate with, interact with and/or include a component or module of a media streaming application (e.g., media streaming application 54). In an embodiment, media streaming application 54 may be capable of providing media streaming, such as, audio streaming, video streaming, data streaming, to client applications (e.g., client applications 10c1, 10c2, 10c3, 10c4) over a packet switched network. In an embodiment, media streaming application 54 may broadcast (i.e., one-to-all), multicast (one-to-many), unicast (one-to-one) media transmissions, and/or combination thereof (e.g., which may be transmitted via one or more of network 14 and network 18 to client applications for streaming of the media on end-users devices).

As may generally be understood, a media streaming application (e.g., media streaming application 54) may generally allow users (e.g., users 36, 38, 40, 42) to access the media streaming application 54 from their computing devices (e.g., client electronic devices 28, 30, 32, 34), where client-side applications (e.g., client applications 10c1, 10c2, 10c3, 10c4) are executed.

Referring also to FIG. 2, and as will be discussed in greater detail below, DMS process 10 may select 100 a time window for monitoring discontinuities in a plurality of packets in a media transmission stream. The time window may have a first time indicating a beginning of the time window and a second time indicating an end of the time window. The method may also determine 102 a number of discontinuities in the plurality of packets at the first time at a network node. The method may also determine 104 the number of discontinuities in the plurality of packets at the second time at the network node. The method may also determine 106 the number of discontinuities in the plurality of packets within the time window. The method may also compare 108 the number of discontinuities within the time widow to a plurality of predefined discontinuities threshold values. The method may also decode 110 one or more of the plurality of packets in the media stream based upon, at least in part, the comparison of the number of discontinuities within the time widow to the plurality of predefined discontinuities threshold values.

Figure 3:
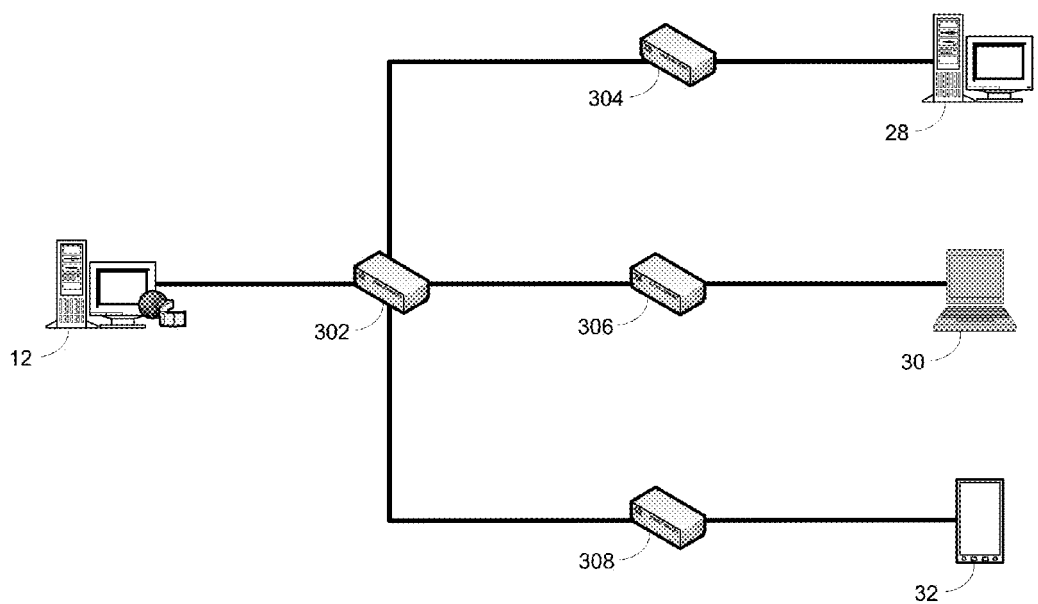
FIG. 3 is a diagrammatic representation of an example DMS process of FIG. 1, according to an implementation of the present disclosure.

A media stream may include any streaming media, such as video, audio, data, etc., however for illustrative purposes, video streaming will be discussed below as an example of media streaming. Generally, video streaming over IP network may have multiple communication nodes that include a server responsible for transmitting the content, users that receive the content on their devices, and intermediary nodes on the network responsible for carrying the content from the server to the end-user. For example, FIG. 3 depicts an example of an IPTV network, which may include a video head-end or source (e.g., server 12), communication nodes (e.g., nodes 302, 304, 306 and 308), and end-user devices (e.g., client electronic devices, 28, 30 and 32), which are connected together to allow media streams to travel from the video head-end (e.g., server 12) to end-users devices (e.g., client electronic devices, 28, 30 and 32). DMS process 10 may execute on one or more of these nodes of the IP network via client-side applications (e.g., client applications 10c1, 10c2, 10c3).

With additional reference to FIG. 3, DMS process 10 may select 100 a time window for monitoring discontinuities in a plurality of packets in a media transmission stream. The time window may have a first time that may indicate a beginning of the time window and may have a second time that may indicate the end of the time window. For example, in the IP network, where the video head-end or source (e.g., server 12) may be transmitting streaming media (e.g., video content) over a period of time, DMS process 10 may select 100 a time window over which to monitor the media stream for discontinuities. The time window size may be expressed in a time unit (e.g., milliseconds, seconds, minutes, etc.). The time window may contain a start time and an end time. The start time may indicate the beginning of the time window expressed in time unit (e.g., milliseconds, seconds, minutes, etc.). The end time may indicate the end of the time window expressed in time unit (e.g., milliseconds, seconds, minutes, etc.). During that time window, DMS process 10 may monitor discontinuities in the video transmitted from the video head-end or source (e.g., server 12) to its destination, e.g., at least one end-user device (e.g., client electronic devices 28, 30 and 32). For example, and referring to FIG. 4A, a time window may be designated between times T1 and T2. T1 may be designated as the start time of the time window and T2 may be designated as the end of that time window.

The media transmission stream may include at least one of a video transmission, a voice transmission, and a data transmission over the Internet. DMS process 10 may manage multiple protocol streams. For example, media streams may include any media such as audio, video, data or the like. However, for illustrative purposes, video streaming may be discussed as an example of the media streaming.

The media transmission stream may include an MPEG-TS and the discontinuities in the plurality of packets may include MPEG-TS packet discontinuities. As explained above, media streaming may be performed following the MPEG transport stream (MPEG-TS) protocol, which specifies the format of packets used for transporting the media from a source (e.g., server 12) to end-users devices (e.g., client computing devices 28, 30 and 32). Further, the discontinuities may be of an MPEG-TS type of packet discontinuities defined in the MPEG-TS standard.

In one embodiment, and during the selected time window, DMS process 10 may buffer video signals. For example, DMS process 10 may buffer video signals transmitted from the video head-end or source (e.g., server 12) to end-user devices (e.g., client electronic devices 28, 30 and 32). It is understood a buffer may be a region in a storage medium used to temporarily store data while the data may be moved from one place to another. For example, buffering may include storing the video signals during the selected time window using a storage device (e.g., storage device 16, or a storage device associated with a network node, such as nodes 302, 304, 306, or the like). The buffer may be replaced by other video signals as time elapses. For example, as video signals are transmitted, the signals may be buffered for a period of time equal to the size of the selected time window. For example, a network operator may wish to keep a constant 10 second worth of packets associated with a media stream to be checked for discontinuities. It is understood that the above is only an example of using a buffer; other techniques of buffering may be employed.

In an embodiment, the buffer may be a sliding window type buffer, where the size and duration of the time window used to buffer media content may vary. A buffering window may stay open for buffering media streams as long as an activity is active. For example, DMS process 10 may continue to buffer the media content until a remedial action is taken. Other scenarios and activities may apply to determine the size and duration of a window type buffer. It is understood that the above are examples of buffering video signals and not a limitation, other techniques for buffering such signals may be employed.

DMS process 10 may also determine 102 the number of discontinuities in the plurality of packets at the first time at a network node. For example, the number of discontinuities at the start time (e.g., T1) of the time window may be determined 102 by DMS process 10. As explained above, the number of discontinuities may determined from the header of packets associated with the media stream. At the start time (e.g., T1) of the time window, DMS process 10 may access the buffered media content to determine 102 the number of discontinuities for that time (e.g., T1). The number of discontinuities at the start time (e.g., T1) may be saved in a storage device (e.g., storage device 16 and/or another storage device, such as a storage device associated with a network node).

The method may also determine 104 the number of discontinuities in the plurality of packets at the second time at the network node. For example, the number of discontinuities at the end time (e.g., T2) of the time window may be determined 104 by DMS process 10. At the end time of the time window, DMS process 10 may access the buffered media content to determine 104, the number of discontinuities for that time (e.g., T2). The number of discontinuities at the end time (e.g., T2) may be saved in a storage device (e.g., storage device 16 and/or in another storage device, such as a storage device associated with a network node).

The method may also determine 106 the number of discontinuities in the plurality of packets within the time window. For example, during the time window between the start time (e.g., T1) and the end time (e.g., T2) the number of discontinuities may be determined 106 by DMS process 10 by comparing the number of discontinuities at the start time (e.g., T1), and the number of discontinuities at the end time (e.g., T2). Comparing the number of discontinuities between T1 and T2 may be accomplished by determining the variation in the number of discontinuities between these two times. For example, if at T1 the number of discontinuities was determined 102 to be equal to 10, and the number of discontinuities at T2, was determined 104 to be equal to 15, then the variation between these two times is equal to the difference of 5 discontinuities. Therefore, DMS process 10 may determine 106 that the number of discontinuities in the plurality of packets within the time window is equal to 5 discontinuities.

In some instances, the determined 106 number of discontinuities in the plurality of packets within the time window may include the change in discontinuities within the time window. In some embodiments, a discontinuity rate may be determined based upon the number, or the change in number, of discontinuities in the time window divided by the duration of the time window.

The method may also compare 108 the number of discontinuities within the time widow to a plurality of predefined discontinuities threshold values. The predefined discontinuities threshold values may be assigned by a media content provider, a network operator, a network administrator, or may be assigned by DMS process 10 and/or media streaming application 54. For example, a lower threshold and a higher threshold for discontinuities may be defined by DMS process 10 to be used for comparison with the actual number of discontinuities experienced during media streaming within a time window. In general, the lower threshold may be used to determine the impact to the quality of experience associated with the media stream. For example, if the number of discontinuities is lower than the lower threshold, this may indicate that the user experience may not be adversely impacted by the number of discontinuities in the media stream content, and therefore the video stream may be deemed acceptable. Similarly, the higher threshold may be used to determine the impact of the quality of experience associated with the media stream, where if the number of discontinuities is higher than the higher threshold, the user experience may be adversely impacted and therefore the video stream may be deemed unsatisfactory. For example, and referring to FIG. 4A, a lower threshold (e.g., Threshold 1) may be set for the number of discontinuities and a higher threshold (e.g., Threshold 2) may be set for the number of discontinuities. Suppose that the lower threshold (e.g., Threshold 1) is defined at 3 discontinuities and the higher threshold (e.g., Threshold 2) is defined at 15 discontinuities. If DMS process 10 determines 106 that the number of discontinuities in the plurality of packets associated with a media stream (e.g., video stream) within the time window, between time T1 and time T2, is equal to 20 discontinuities, DMS process 10 may deem that the media stream is unsatisfactory, e.g., because the number of discontinuities may be greater than the higher threshold. However, if the number of discontinuities in the plurality of packets within the time window is equal to 1 discontinuity, DMS process 10 may deem that the media stream is acceptable, e.g., because the number of discontinuities may be less than the lower threshold.

In one embodiment, a plurality of thresholds may be defined. For example, and referring to FIG. 4B, a number of thresholds may be defined (e.g., Thresholds, 1, 2, 3, 4) for the number of discontinuities over a time window (e.g., time window between T1 and T2). The plurality of thresholds may be associated with the type of analysis performed at a level of discontinuities determined within the time window. For example, between a lower threshold (e.g., Threshold 1), and a higher threshold (e.g., Threshold 2) there may be two other thresholds defined (e.g., Threshold 3 and Threshold 4), which may indicate the type of analysis to be performed below and above these two thresholds (e.g., Threshold 3 and Threshold 4). In other words, one mechanism may be performed on packets associated with a media stream experiencing a number of discontinuities between Threshold 1 and Threshold 3, and another mechanism may be performed on packets are packets associated with a media stream experiencing a number of discontinuities between Threshold 3 and Threshold 4. A mechanism may be an algorithm for analyzing, algorithm for decoding, algorithm for monitoring, and algorithm for reporting. It is understood that the analysis performed and the mechanisms performed on the media stream experiencing a number of discontinuities that fall within the plurality of thresholds may include a decoding algorithm, various analysis algorithms, reporting algorithms, logging algorithms, or any other types of actions that may be taken on the plurality of packets associated with a media stream. Although, four thresholds are discussed, this is only an example, and not intended to be a limitation, any number of thresholds may be defined.

In an embodiment, the plurality of thresholds may be adjusted at any stage of media transmission. One or more of the defined thresholds may be adjusted automatically or by a network operator before, during and after a media transmission. For example, after the start of a sports broadcast video transmission during a certain time over IPTV, DMS process 10 may define a plurality of discontinuities thresholds that may be appropriate for such broadcast at that time. This also could be achieved by a media content provider, a network operator, a network administrator or any user having appropriate privileges to be able to adjust the discontinuities thresholds values. In another embodiment, the discontinuities thresholds may also be adjusted during the video transmission, for example, while viewing the sports broadcast video transmission, there may be a need to adjust the discontinuities thresholds, for example, due to a change of membership to the service, time of day, expiration of a membership to the service, maintenance on the network, and many other possibilities that may induce the need to modify the threshold values. In another embodiment, the discontinuities thresholds values may be adjusted after the completion of the video transmission, for example, in preparation for a next video transmission. It is understood that the above are examples of instances where the various thresholds may be adjusted; other scenarios may necessitate the adjustment of one or more discontinuities thresholds at various stages of the video transmission.

In one embodiment, the lower and higher thresholds may be independent of the type of media stream. For example, the lower and higher thresholds may be applied to all media streams that may be monitored by DMS process 10, such as, video, audio, data or any other media stream format. In this scenario, DMS process 10 may set the lower and higher thresholds independently of the type of media stream.

In some embodiments, the lower and higher thresholds may vary with the type of media stream. For example, a video media stream may have a lower tolerance for discontinuities such that the lower and higher thresholds may be set differently than an audio media stream, which might have a higher tolerance for discontinuities. For example, a lower threshold for video may be set to 2 discontinuities, while a lower threshold for audio may be set to 10 discontinuities. It is understood that the above are only examples of lower thresholds and other examples may be envisioned.

In other embodiments, the lower and higher thresholds may vary within each type of media stream (e.g., video, audio, data, etc.). For example, different content types associated with a video stream may have different thresholds. For example, a video stream associated with a sporting event during a live feed, may have little tolerance for discontinuities and hence have different thresholds than a video stream associated with a web content, such as You-Tube®.

It will be appreciated that the DMS process 10 may predefine various threshold values associated with various media stream types, characteristics and conditions. For example, DMS process 10 may predefine thresholds based upon the time of day and/or day of the week, and/or the video stream being broadcasted, a content variety associated with the video stream, or other characteristic.

The method may also decode 110 one or more of the plurality of packets in the media stream based upon, at least in part, the comparison of the number of discontinuities within the time widow to the plurality of predefined discontinuities threshold values. For example, as explained above, media streams such as video streams may be composed of packets that may be delivered to an endpoint, such as a user device. In certain scenarios, the path between the source and the endpoint may experience some degradation in video quality. For example, some of the video packets may contain errors within the payload portion of packets (e.g., the portion of a packet that contains the actual video data), or some of the packets may be lost (e.g., not delivered to the end point, or monitoring node, at all, or not delivered within a usable timeframe to allow the information to be included as part of the media stream during playback). As explained above, the number of discontinuities may be reported in the header portion of the packets associated with the media stream. The number of discontinuities that may be reported in the header of media stream packets may assist in identifying the portions of media streams experiencing errors. Some of the common sources for errors may include, at least in part, noise, corruption, packet loss, packets out of order, and other possible issues that would result in video distortion and degradation along the path between a video source (e.g. head-end server) and end-users. In some embodiments, the discovery of discontinuities in media streams may result in taking remedial actions to correct the errors in the video stream causing the discontinuities to be incremented. Remedial actions may include, but not limited to, reporting the quality of experience (e.g., an unsatisfactory QoE due to relative number of discontinuities compared to the lower and higher thresholds), to a management system, reporting back up the network path to one or more upstream nodes (e.g., relative to the node at which the determination 106 of the number of discontinuities in the plurality of packets within the time window is made), re-routing of packets associated with the media stream to improve quality (e.g., a node experiencing issues may be associated with the decrease and video quality, and the media stream may be routed through a different node), downgrading the stream to a lower quality, comparing the affected video portions experiencing the discontinuities within the time window to the equivalent video content, leaving the source nodes (e.g., server 12).

In one embodiment, a possible remedial measure that may be taken at a node in the network may be to decode each and every packet of the video content then compare the content to the original video content as it left the video server. Consequently, when errors or mismatches are found as a result of decoding the video content, remedial steps could be taken to correct the errors to ensure every packet contains, to a certain degree, the same content as when the original video left the video server. This technique would ensure that every portion of the video stream, to a certain degree, is the same as was originally transmitted from the source. In some embodiments, measures may be taken to decode and correct the problems reported by comparing the number of discontinuities in the packets associated with the media stream (e.g., video content) within a time window to a number of predefined discontinuities thresholds. For example, depending on the comparison, DMS process 10 may decode 110 or not decode one or more of the plurality of packets in the media stream. In some such embodiments, comparing the number of discontinuities within the time window to a number of predefined discontinuity thresholds may be less resource intensive and/or less time consuming than comparing the decoded video to the originally transmitted video, which may reduce some delays in the video content streaming.

Figure 4A:
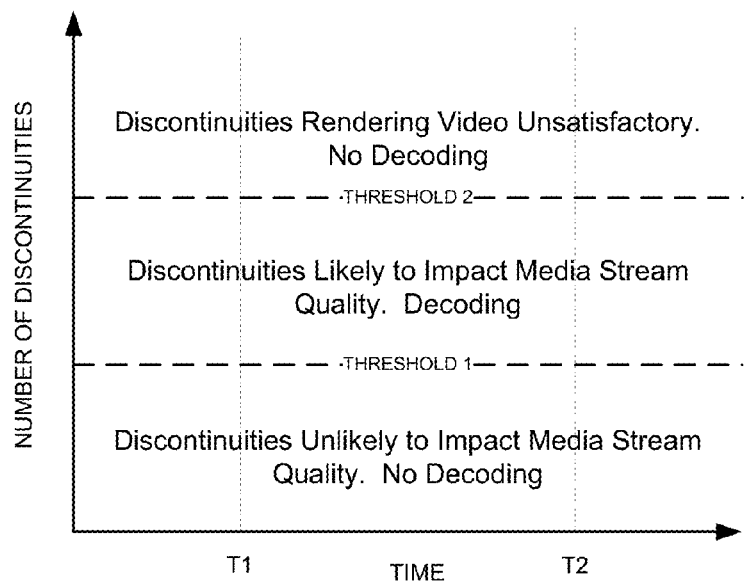
FIG. 4A is a diagrammatic representation of an example DMS process of FIG. 1, according to an implementation of the present disclosure.
Figure 4B:
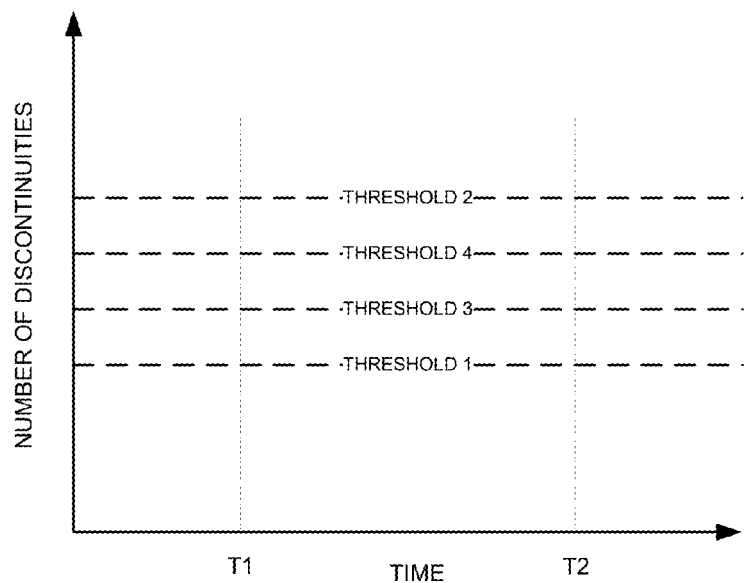
FIG. 4B is a diagrammatic representation of an example DMS process of FIG. 1, according to an implementation of the present disclosure.

In some embodiments, decoding the one or more of the plurality of packets may decode 112 the one or more of the plurality of packets in the media transmission stream, when the number of discontinuities was determined to fall between the first discontinuities threshold and the second discontinuities threshold. Referring to FIG. 4A, DMS process 10 may decode 112 packets associated with a media stream (e.g., video content), when the number of discontinuities (represented on the Y axis) falls between the lower threshold (e.g., Threshold 1), and the higher threshold (e.g., Threshold 2) during a time window (represented on the X axis) defined between a start time (e.g., T1), and an end time (e.g., T2), the discontinuities may likely impact the media stream content in such a way that the quality of experience may be affected. For illustrative purposes, assume that the number of discontinuities within the time window was determined 106 to be equal to 15 discontinuities. Further, assume that the lower threshold (e.g., Threshold 1) is equal to 10 discontinuities and the upper threshold (e.g., Threshold 2) is equal to 20, in that case, the number of discontinuities for the time window (i.e. 15 discontinuities) falls between the lower threshold (e.g., 10 discontinuities) and the upper threshold (e.g., 20 discontinuities). DMS process 10 may indicate that the video quality may be questionable and that further remedial actions may be performed on the plurality of packets associated with the media stream. As explained above, remedial actions may include, but not limited to, reporting the quality of experience (e.g., an unsatisfactory QoE due to relative number of discontinuities compared to the lower and higher thresholds), to a management system, reporting back up the network path to one or more upstream nodes (e.g., relative to the node at which the determination 106 of the number of discontinuities in the plurality of packets within the time window is made), re-routing of packets associated with the media stream to improve quality (e.g., to avoid or circumvent a node experiencing issues that may be associated with the decrease and video quality), downgrading the stream to a lower quality, comparing the affected video portions experiencing the discontinuities within the time window to the equivalent video content, leaving the source nodes (e.g., server 12), for example, to ascertain the degree or nature of the impact of the discontinuities on the quality of experience.

In some embodiments, decoding the one or more of the plurality of packets may include refraining 114 from decoding the one or more of the plurality of packets in the media transmission stream when the number of discontinuities within the time window is outside the first discontinuities threshold and the second discontinuities threshold. Continuing with the above example, DMS process 10 may refrain 114 from decoding the video packets when the number of discontinuities within the time window (e.g., between T1 and T2), falls below the lower threshold (e.g., Threshold 1), or falls above the upper threshold (e.g., Threshold 2). For illustrative purposes, assume that, the number of discontinuities within the time window is equal to 5 discontinuities and the lower threshold (e.g., Threshold 1) is equal to 10 discontinuities and the upper threshold (e.g., Threshold 2) is equal to 20 discontinuities, in that case, the number of discontinuities falls below (i.e., is less than) the lower threshold (e.g., 10 discontinuities). Having a number of discontinuities below the lower threshold may indicate that the video quality may still be satisfactory, even though, there are some discontinuities in the video stream in that time window. Hence, DMS process 10 may refrain 114 from decoding the media transmission stream because the video quality, e.g., and, therefore, the quality of experience may still be considered satisfactory.

In one embodiment, decoding 112 the one or more of the plurality of packets may designate 116 the media transmission stream as unsatisfactory in response to determining 106 that the number of discontinuities may be above the second discontinuities threshold. For illustrative purposes, a number of discontinuities equal to 25 within the time window and a higher threshold (e.g., Threshold 2) equal to 20 discontinuities may signify that the number of discontinuities falls above (i.e., is greater than) the higher threshold (e.g., 20 discontinuities). Having a number of discontinuities above the higher threshold may indicate that the video quality may be considered unwatchable or unsatisfactory. Consequently, DMS process 10 may designate 116 media transmission stream as unsatisfactory based upon determining that the number of discontinuities may be above the higher threshold. In such a scenario, DMS process 10 may refrain 114 from decoding the packets associated with the media stream since the discontinuities number within the time window falls above the higher threshold and since the video quality.

DMS process 10 may further include at least one of reporting 118 information related to the quality of the media transmission stream within the time window and adapting 120 the quality of the media transmission stream based upon, at least in part, the number of discontinuities within the time window. For example, as explained above, during the transmission of a video signal from the source (e.g. server 12) to end-user devices (e.g., client computing devices 28, 30, 32), the video signal may travel through one or more of the communication nodes (e.g., nodes 302, 304, 306 and 308) and may experience degradation that may cause the perceived quality of experience of the end-user (e.g., users 36, 38, and 40) with the video stream to be impacted. In that case, a network operator, a network administrator, DMS process 10 and/or media streaming application 54 may perform actions that may impact (e.g., by improving or attempting to improve) the quality of experience of a media stream user (e.g., users 36, 38, and 40) based upon the number of discontinuities within the time window.

In some embodiments, DMS process 10 may report 118 information related to the quality of the media transmission stream within the time window based upon, at least in part, the number of discontinuities within the time window. For example, DMS process 10 may monitor the media streams in order to report 118 information related to the quality of the media stream within a time window. As explained above, unicast and multicast types of communications may be used when transporting media content between a source and a destination. In a unicast communication, which is performed on a one-to-one basis, and in a multicast communication, which is performed on a one-to-many basis, video content may be monitored by DMS process 10 to collect data metrics associated with the video stream, such as, MPEG-TS discontinuities, detailed packet analysis measurements, unwatchable seconds, etc. The collection of monitoring data may be used for logging or for troubleshooting purposes. As explained above, DMS process may determine 106 the number of discontinuities within a time window during which a video content is transmitted from a source node (e.g., server 12) through a network to reach end-user devices (e.g., client electronic devices 28, 30 and 32). Further, as explained above, the use of a lower threshold (e.g., Threshold 1) and a higher threshold (e.g., Threshold 2) may determine whether DMS process 10 may decode 112 or refrain 114 from decoding the plurality of packets associated with the video content within a time window. DMS process 10 may notify the source node (e.g., server 12), a node located in the path of the video signals transmissions, and/or another device, of the number of discontinuities associated with the quality of the media transmission stream within a time window. DMS process 10 may also notify a network operator, a network administrator or media streaming application 54.

For example, a user device (e.g., client electronic devices 28, 30 or 32) may monitor, through DMS process 10, the number of discontinuities during a time window during media streaming (e.g., video streaming). The result of the monitoring may be reported back to a media content provider (e.g., a provider for IPTV streaming content), a network operator (e.g., responsible for monitoring video flows that take place in a video stream), one or more nodes between the source node (e.g., server 12) and the user device (e.g., client electronic devices 28, 30 and 32), such as, nodes 302, 304, 306, and 308, and the source node (e.g., server 12). In some embodiments, the collected and monitored data may be continuously and/or periodically pushed back to the video service provider, e.g., for customer experience management. In some embodiments, the collected unmonitored data may also allow a system operator to determine the existence and degree of any bottlenecks or problems in the media distribution network. Although, in the previous example, the number of discontinuities was reported back, however, other information relating to the video content that may be relevant to the quality of experience that is experienced by the end-user. Other metrics associated with the quality of experience may also be monitored. As explained above, the quality of experience may be influenced by many factors, such as, network conditions over which the media stream is transmitted, the user's terminal device, the user's environment, the user's expectations, the quality of the video, and the nature of the content and its importance.

In some embodiments, in a unicast communication session, DMS process 10 may monitor, e.g., for the purpose of reporting 118, information related to the quality of the media transmission stream within the time window and/or may adapt 120 the quality of the media transmission stream based upon, at least in part, the number of discontinuities within the time window. In scenarios where a one-to-one communication is performed, e.g., from a source node (e.g., server 12) to the end-user devices (e.g., client electronic devices 28, 30 and 32), the end-user device may be enabled to perform analysis on the video content received from a node in the network (e.g., server 12). Video content may be monitored to collect monitoring data, such as, MPEG-TS discontinuities, detailed packet analysis measurements, unwatchable seconds, etc. The user device may also be enabled to perform in-network video adaptation, based upon, at least in part, the number of discontinuities determined within a time window. As explained above, DMS process 10 may determine 106 the number of discontinuities within a time window during which a video content is transmitted from a source node (e.g., server 12) through a network to reach end-users devices (e.g., client electronic devices 28, 30 and 32). Further, as explained above, the use of a lower threshold and a higher threshold may assist in determining whether to decode 112 or refrain 114 from decoding the plurality of packets associated with the video content. For example, DMS process 10 may determine 106 the number of discontinuities within a time window to fall within a lower threshold (e.g., Threshold 1), and a higher threshold (e.g., Threshold 2). In this case, DMS process 10 may decode 110 one or more of the plurality of packets in the media transmission stream to perform remedial actions with respect to the packets associated with the media stream. As explained above, remedial actions may include, but are not limited to, reporting the quality of experience (e.g., an unsatisfactory QoE due to relative number of discontinuities compared to the lower and higher thresholds), to a management system, reporting back up the network path to one or more upstream nodes (e.g., relative to the node at which the determination 106 of the number of discontinuities in the plurality of packets within the time window is made), re-routing of packets associated with the media stream to improve quality (e.g., a node experiencing issues may be associated with the decrease and video quality), downgrading the stream to a lower quality, comparing the affected video portions experiencing the discontinuities within the time window to the equivalent video content, leaving the source nodes (e.g., server 12). DMS process 10 may use the monitoring data to trigger quality adaptation requests to be sent to the video server (e.g., server 12). Quality adaptation request may include a message from the node experiencing a number of discontinuities that warrant DMS process 10 to perform further analysis (e.g., decoding the media stream content) that may be sent to a preceding node or may be sent to the source node (e.g., server 12). In response to the quality adaptation request, the video server (e.g., server 12), executing media streaming application 54, or another node or device, may perform one or more of the aforementioned remedial actions to enhance the quality of experience at the end-user devices (e.g., client electronic devices 28, 30 and 32).

Figure 5:
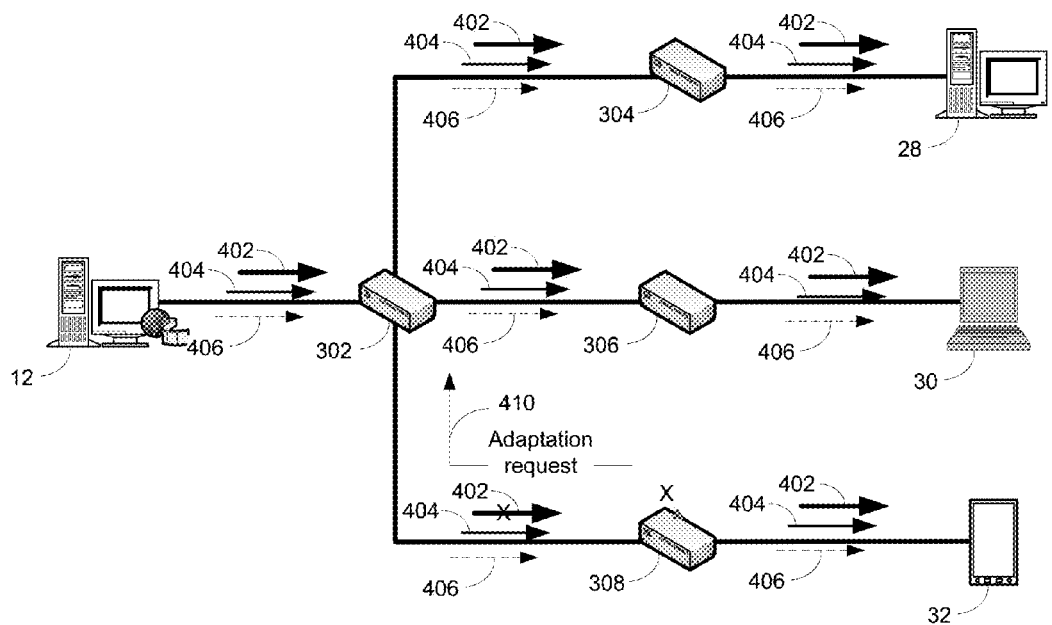
FIG. 5 is a diagrammatic representation of an example DMS process of FIG. 1, according to an implementation of the present disclosure.

As shown in FIG. 5, the media stream distributed through the network may be available as high-resolution video (e.g., video 402), medium resolution video (e.g., video 404), and low resolution video (e.g., video 406). The case of a unicast communication session (e.g., one-to-one communication), media adaptation may involve the source node (or a proceeding communication node), and the node reporting the monitoring data (e.g., a user device or a communication node in the communication network). For example, in a unicast communication session between the source node (e.g., server 12), and a user device (e.g., client electronic device 32), if the user device (e.g., client electronic device 32) experiences a number of discontinuities in the media stream within a time window that may warrant DMS process 10 to decode 110 the media stream, the user device (e.g., client electronic device 32) may communicate (e.g., using adaptation requests) with the source node (e.g., server 12). As explained above, quality adaptation request is a message from the node experiencing a number of discontinuities that warrant DMS process 10 to perform further analysis (e.g., decoding the media stream content) that may be sent to a preceding node or may be sent to the source node (e.g., server 12). The source node may adapt the media stream through remedial actions that may affect that user device (e.g., client electronic device 32), involved in the unicast communication session. However, the media adaptation may not affect other nodes or user devices in the network (e.g., nodes 302, 304, 306, 308 and client electronic devices 28 and 32) because they may not be involved in the unicast session. In that sense, if the remedial action is to degrade the stream to a lower quality (e.g. video 404 or 406), while maintaining satisfactory quality of experience, then only the user reporting the monitoring data (e.g., client electronic device 32) may be subjected to the degradation of video quality, while other communication nodes (e.g. nodes 302, 304, 306 and 308), and end-user devices (e.g., client electronic devices 28 and 30) may continue to receive non-degraded media stream as they may be involved in different communication sessions. Continuing with the example above, DMS process 10 may deem it necessary to reduce the quality of the video stream from a high-resolution video (e.g., video 402) to a medium-resolution video (e.g., video 404). This reduction in the quality of the video stream may not affect other communication nodes (e.g., nodes 302, 304, 306, 308) or user devices (client electronic devices 28 and 30) in the network as they may be involved other communication sessions. It is understood that the above are only examples, other examples of unicast communication sessions between communication nodes in a network may exist.

In another embodiment, endpoints that are connected to the video server (e.g., server 12) through an unreliable or congested link (e.g., through communication node 308), where DMS process 10 may deem the video quality as questionable requiring further remedial actions on the packets associated with the media stream, may be subjected to the reduction of video quality. For example, as communication node, 308 may be subjected to a remedial action resulting in reduced quality of video stream; the endpoint (e.g., client communication device 32) may be subjected to the same reduced quality of video stream. In this case communication node 308 and client computing device 32 may receive the reduced quality video stream, such as, the medium-resolution video (e.g., video 404), as a result of DMS process 10 adapting 120 the quality of the media stream based upon the number of discontinuities within the time window. Other communication nodes (e.g., nodes 302, 304, 306 and client computing devices 28, 30) may be unaffected with the video stream quality adaptation and may continue to receive a higher quality video stream transmitted from the video server (e.g., server 12). It is understood that the above is only an example of one communication node experiencing a reduction video stream quality as a remedial measure other examples of communication nodes may be subjected to one or more remedial measures, such as, the remedial measures mentioned above including reduction of video stream quality.

In another embodiment, where a multicast communication session may be used, DMS process 10 may monitor for the purpose of reporting 118 information related to the quality of the media transmission stream within the time window and/or may adapt 120 the quality of the media transmission stream based upon, at least in part, the number of discontinuities within the time window. In a multicast communication, where communication is performed on a one-to-many basis, video content may be monitored by DMS process 10 to collect monitoring data, such as, MPEG-TS discontinuities, detailed packet analysis measurements, unwatchable seconds, etc., DMS process 10 may enable real-time in-network video quality adaptation for multicast streams. Referring to FIG. 5, in this scenario, each intermediate node in the network may be enabled to dynamically adapt the media stream before forwarding the adapted video stream to a subsequent node. For example, assuming that server 12, nodes 302, 304, 308 and user devices 28 and 32 are involved in a multicast communication (e.g., subscribed newsfeed). As explained above, DMS process 10 may determine 106 the number of discontinuities within a time window during which a video content is transmitted from a source node (e.g., server 12) through a network to reach end-users (e.g., users 28 and 32). Further, as explained above, DMS process 10 may determine whether to decode 112 or refrain 114 from decoding the plurality of packets associated with the video content, based upon, a lower threshold and a higher threshold for discontinuities within the time window. For example, DMS process 10 may determine 106 the number of discontinuities within a time window to fall within a lower threshold (e.g., Threshold 1), and a higher threshold (e.g., Threshold 2). In this case, DMS process 10 may decode 110 one or more of the plurality of packets in the media transmission stream in order to perform a remedial action. As explained above, remedial actions may include, but not limited to, re-routing the plurality of packets to improve quality, downgrading the stream to a lower quality, comparing the affected video portions experiencing the discontinuities within the time window to the equivalent video content leaving the source nodes (e.g., server 12). For example, if communication node 308 experiences a number of discontinuities within a time window that would warrant DMS process 10 to decode 110 the media stream in order to take remedial actions, communication node 308 may report 118 the monitored data or may trigger quality adaptation requests (e.g., adaptation request 410) to be sent to a preceding node (e.g., node 302) or the source node (e.g., server 12), which may cause DMS process 10 to adapt 120 the quality of the media stream. Consequently, the preceding node (e.g., node 302) or the source node (e.g., server 12) may perform remedial actions that may affect the node reporting the discontinuities (e.g., node 308). The adaptation of the media stream according to the remedial action chosen may affect the reporting node (e.g., node 308), and/or all other nodes participating in the multicast session (e.g., server 12, nodes 302, 304 and 308, client electronic devices 28 and 32). Other nodes or user devices that are not participating in that multicast session (e.g., node 306 and client electronic device 30) may not be affected by the media stream adaptation.

As shown in FIG. 5, the media stream distributed through the network may be available as high-resolution video (e.g., video 402), medium resolution video (e.g., video 404), and low resolution video (e.g., video 406). A number of nodes (e.g., nodes 302, 304 and 308, and client computing devices 28 and 32) may be participating in a multicast communication session (session 1) with the video source (e.g., server 12). Other nodes in the network (e.g., nodes 302, 306 and client computing device 30) may be participating in a different multicasts communication session (session 2) with the video source (e.g., server 12). If, for example, node 308 experiences a number of discontinuities (as depicted by the X mark above the communication node 308) within a time window that warrant DMS process 10 to decode 110 the media stream, a remedial action may be taken by DMS process 10, in which DMS process 10 may reduce the quality of the video stream from a high-resolution video (e.g., video 402) to a medium-resolution video (e.g., video 404), as depicted by the X mark over the high-resolution video 402. In that case, other communication nodes participating in the multicast communication session (e.g., session 1) may be subjected to the reduction of quality of the video stream (not shown in FIG. 5), for example, from a high-resolution video (e.g., video 402) to a medium-resolution video (e.g., video 404), as a result of DMS process 10 adapting 120 the quality of the media stream based upon the number of discontinuities within the time window In this example, nodes 302, 304 and 308, and client computing devices 28 and 32 may receive the reduced quality video stream, such as, the medium-resolution (e.g., video 404) because these nodes are also involved in the multicast communication session (e.g., session 2), however, the X marks above the affected nodes in FIG. 5 are not shown in this scenario. In this scenario, other nodes participating in a different multicast communication session (e.g., session 2), may continue to receive their media stream at a high-resolution (e.g., video 402), since DMS process may not have adapted 120 the quality of the media stream and since multicast communication session 2 is separate from multicast communication session 1.

It is understood that the above are only examples of remedial actions taken and communication sessions established; other remedial actions and communication sessions may be envisioned.

It is understood that the above are only examples and should not be construed as limitations, other examples may be envisioned. Additionally, although unicast and multicast communication sessions are described above, other communication sessions, such as, broadcasting communication sessions may also be implemented using a similar technique.

Figure 6:
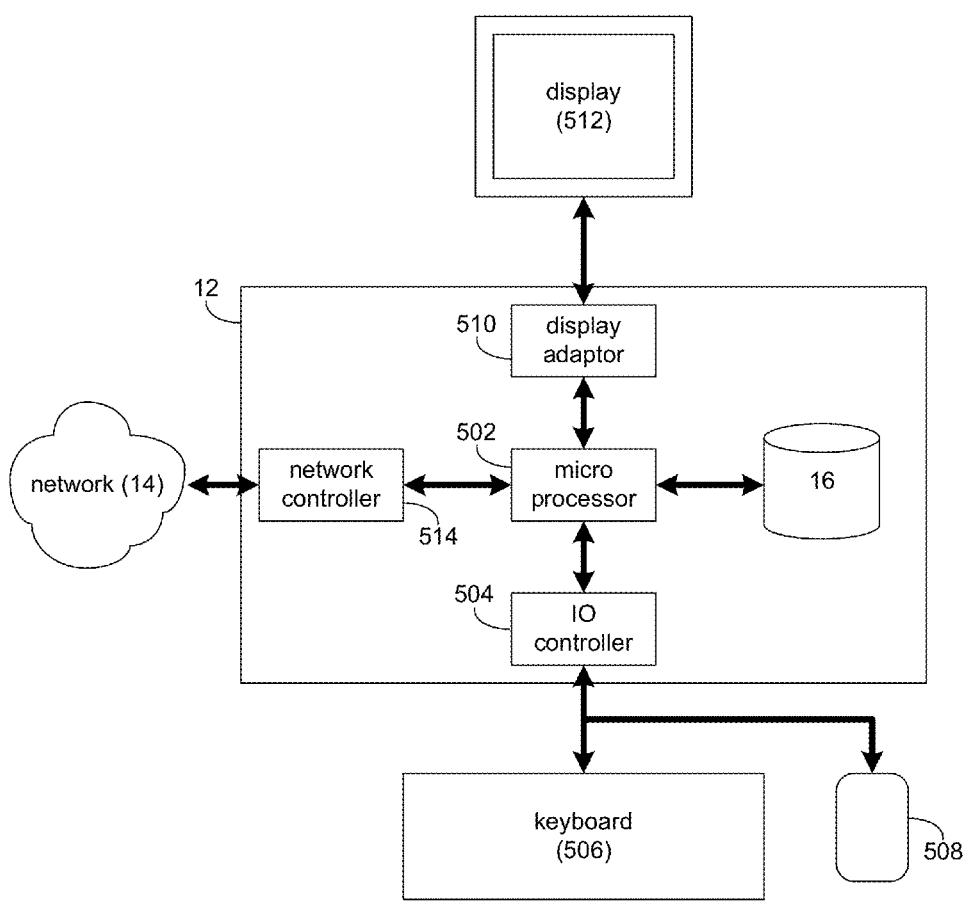
FIG. 6 is a diagrammatic view of the computing device of FIG. 1, according to an implementation of the present disclosure.

Referring also to FIG. 6, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, DMS process 10 may be substituted for computing device 12 within FIG. 6, examples of which may include but are not limited to client electronic devices 28, 30, 32, 34.

Computing system 12 may include microprocessor 502 configured to e.g., process data and execute instructions/code for screen capture process 10. Microprocessor 502 may be coupled to storage device 16. As discussed above, examples of storage device 16 may include but are not limited to a hard disk drive; a tape drive; an optical drive; a RAID device; an NAS device, a Storage Area Network, a random access memory (RAM); a read-only memory (ROM); and all forms of flash memory storage devices. IO controller 504 may be configured to couple Microprocessor 502 with various devices, such as keyboard 506, mouse 508, USB ports (not shown), and printer ports (not shown). Display adaptor 510 may be configured to couple display 512 (e.g., a CRT or LCD monitor) with microprocessor 502, while network adapter 514 (e.g., an Ethernet adapter) may be configured to couple Microprocessor 502 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate or transport the program for use by or in connection with the instruction execution system, apparatus or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, C#.NET, PHP, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 502) of a general purpose computer/special purpose computer/other programmable data processing apparatus (e.g., computing device 12), such that the instructions, which execute via the processor (e.g., processor 502) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    selecting, by one or more processors, a time window for monitoring discontinuities in a plurality of packets in a media transmission stream, the time window having a first time indicating a beginning of the time window and a second time indicating an end of the time window, wherein discontinuities in the plurality of packets include an error to at least one packet of the plurality of packets in the media transmission stream;
    determining, by the one or more processors, how many discontinuities in the plurality of packets are detected at the first time at a network node;
    determining, by the one or more processors, how many discontinuities in the plurality of packets are detected at the second time at the network node;
    determining, by the one or more processors, how many discontinuities in the plurality of packets are detected within the time window by determining a difference between how many discontinuities are detected at the first time and how many discontinuities are detected at the second time;
    comparing, by the one or more processors, how many discontinuities are detected within the time widow to a plurality of predefined discontinuities threshold values; and
    decoding one or more of the plurality of packets in the media transmission stream based upon, at least in part, the comparison of how many discontinuities are detected within the time widow to the plurality of predefined discontinuities threshold values.

2. The method of claim 1, wherein the media transmission stream includes an MPEG-TS and the discontinuities in the plurality of packets include MPEG-TS packet discontinuities.

3. The method of claim 1, wherein the media transmission stream includes at least one of a video transmission, a voice transmission, and a data transmission over the Internet.

4. The method of claim 1, further including at least one of reporting information related to a quality of the media transmission stream within the time window and adapting the quality of the media transmission stream based upon, at least in part, how many discontinuities are detected within the time window.

5. The method of claim 1, further including decoding the one or more of the plurality of packets in the media transmission stream, when the difference between how many discontinuities are detected at the first time and how many discontinuities are detected at the second time is between a first discontinuities threshold and a second discontinuities threshold.

6. The method of claim 5, further including refraining from decoding the one or more of the plurality of packets in the media transmission stream when the difference between how many discontinuities are detected at the first time and how many discontinuities are detected at the second time is outside the first discontinuities threshold and the second discontinuities threshold.

7. The method of claim 5, further including designating the media transmission stream as unsatisfactory in response to determining that the difference between how many discontinuities are detected at the first time and how many discontinuities are detected at the second time is above the second discontinuities threshold.

8. A computer program product comprising a non-transitory computer readable medium having a plurality of instructions stored thereon, which, when executed by a processor, cause the processor to perform operations including:
  selecting a time window for monitoring discontinuities in a plurality of packets in a media transmission stream, the time window having a first time indicating a beginning of the time window and a second time indicating an end of the time window, wherein discontinuities in the plurality of packets include an error to at least one packet of the plurality of packets in the media transmission stream;
  determining how many discontinuities in the plurality of packets are detected at the first time at a network node;
  determining how many discontinuities in the plurality of packets are detected at the second time at the network node;
  determining how many discontinuities in the plurality of packets are detected within the time window by determining a difference between how many discontinuities are detected at the first time and how many discontinuities are detected at the second time;
  comparing how many discontinuities are detected within the time widow to a plurality of predefined discontinuities threshold values; and
  decoding one or more of the plurality of packets in the media transmission stream based upon, at least in part, the comparison of how many discontinuities are detected within the time widow to the plurality of predefined discontinuities threshold values.

9. The computer program product of claim 8, wherein the media transmission stream includes an MPEG-TS and the discontinuities in the plurality of packets include MPEG-TS packet discontinuities.

10. The computer program product of claim 8, wherein the media transmission stream includes at least one of a video transmission, a voice transmission, and a data transmission over the Internet.

11. The computer program product of claim 8, further including at least one of reporting information related to a quality of the media transmission stream within the time window and adapting the quality of the media transmission stream based upon, at least in part, how many discontinuities are detected within the time window.

12. The computer program product of claim 8, further including decoding the one or more of the plurality of packets in the media transmission stream, when the difference between how many discontinuities are detected at the first time and how many discontinuities are detected at the second time is between a first discontinuities threshold and a second discontinuities threshold.

13. The computer program product of claim 12, further including refraining from decoding the one or more of the plurality of packets in the media transmission stream when the difference between how many discontinuities are detected at the first time and how many discontinuities are detected at the second time is outside the first discontinuities threshold and the second discontinuities threshold.

14. The computer program product of claim 12, further including designating the media transmission stream as unsatisfactory in response to determining that the difference between how many discontinuities are detected at the first time and how many discontinuities are detected at the second time is above the second discontinuities threshold.

15. A computing system comprising:
  at least one processor device, and at least one memory architecture coupled with the at least one processor; the at least one processor device configured to:
  select a time window for monitoring discontinuities in a plurality of packets in a media transmission stream, the time window having a first time indicating a beginning of the time window and a second time indicating an end of the time window, wherein discontinuities in the plurality of packets include an error to at least one packet of the plurality of packets in the media transmission stream;
  determine how many discontinuities in the plurality of packets are detected at the first time at a network node;
  determine how many discontinuities in the plurality of packets are detected at the second time at the network node;
  determine how many discontinuities in the plurality of packets are detected within the time window by determining a difference between how many discontinuities are detected at the first time and how many discontinuities are detected at the second time;
  compare how many discontinuities are detected within the time widow to a plurality of predefined discontinuities threshold values; and
  decode one or more of the plurality of packets in the media transmission stream based upon, at least in part, the comparison of how many discontinuities are detected within the time widow to the plurality of predefined discontinuities threshold values.

16. The computing system of claim 15 further including at least one of reporting information related to a quality of the media transmission stream within the time window and adapting the quality of the media transmission stream based upon, at least in part, how many discontinuities are detected within the time window.

17. The computing system of claim 15 further including decoding the one or more of the plurality of packets in the media transmission stream, when the difference between how many discontinuities are detected at the first time and how many discontinuities are detected at the second time is between a first discontinuities threshold and a second discontinuities threshold.

18. The computing system of claim 17 further including refraining from decoding the one or more of the plurality of packets in the media transmission stream when the difference between how many discontinuities are detected at the first time and how many discontinuities are detected at the second time is outside the first discontinuities threshold and the second discontinuities threshold.

19. The method of claim 1, wherein the media transmission stream is a video transmission, the method further comprising:
   detecting a change in the content of the video transmission from a first content type to a second content type; and
   automatically adjusting the plurality of predefined discontinuities threshold values based on the detected change in the content of the video transmission.

20. The method of claim 19, wherein the first content type is live feed and wherein the second content type is pre-recorded web content.

\* \* \* \* \*